(12) United States Patent
Niguchi et al.

(10) Patent No.: US 7,667,364 B2
(45) Date of Patent: Feb. 23, 2010

(54) BRUSHLESS MOTOR

(75) Inventors: Noboru Niguchi, Kashihara (JP);
Masaru Horikawa, Nara (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 12/174,851

(22) Filed: Jul. 17, 2008

(65) Prior Publication Data

US 2009/0033174 A1 Feb. 5, 2009

(30) Foreign Application Priority Data

Jul. 30, 2007 (JP) ............... 2007-197649

(51) Int. Cl.
*H02K 21/12* (2006.01)
*H02K 1/00* (2006.01)

(52) U.S. Cl. ............... 310/156.55; 310/156.47; 310/216.074

(58) Field of Classification Search ............ 310/156.55, 310/156.47, 216–218
See application file for complete search history.

(56) References Cited

U.S. PATENT DOCUMENTS

| 6,940,198 | B2 * | 9/2005 | Ionel et al. ............. 310/156.47 |
| 7,067,948 | B2 * | 6/2006 | Yamaguchi et al. .... 310/156.47 |
| 2006/0197402 | A1 * | 9/2006 | Gomyo et al. ............. 310/216 |
| 2007/0262659 | A1 * | 11/2007 | Inayama ....................... 310/44 |
| 2007/0273241 | A1 | 11/2007 | Niguchi et al. |
| 2008/0073995 | A1 | 3/2008 | Niguchi et al. |
| 2008/0218023 | A1 | 9/2008 | Niguchi et al. |
| 2008/0224559 | A1 | 9/2008 | Niguchi |

FOREIGN PATENT DOCUMENTS

JP 2001-359266 12/2001

OTHER PUBLICATIONS

U.S. Appl. No. 12/174,851, filed Jul. 17, 2008, Niguchi, et al.

\* cited by examiner

*Primary Examiner*—Quyen Leung
*Assistant Examiner*—Leda Pham
(74) *Attorney, Agent, or Firm*—Oblon, Spivak, McClelland, Maier & Neustadt, L.L.P.

(57) ABSTRACT

A brushless motor includes a stator and a rotor. The stator includes an annular stator core having teeth arranged with a spacing in a circumferential direction of the annular stator core; and coils wound around the teeth respectively. The rotor includes a rotor core and magnetic poles of segment magnets arranged annularly along a circumferential direction of the rotor core. The segment magnets are stacked at a plurality of stages in an axial direction of the rotor core. A length direction of each of the segment magnets is parallel with the axial direction of the rotor core. The following expression is satisfied:

$$(2 \times \beta/P) + \theta < (360/P)$$

where P is the number of the magnetic poles of the segment magnets at each stage, $\beta$ (electrical angle) is the effective pole angular aperture on the outer peripheral surface of the rotor core, and $\theta$ is the skew angle equivalent to a phase shift angle between the corresponding magnetic poles of the segment magnets at the adjacent stages.

6 Claims, 11 Drawing Sheets

BRUSHLESS MOTOR

The present application is based on Japan Patent Application No. 2007-197649 filed on Jul. 30, 2007, the contents of which are incorporated herein for reference.

BACKGROUND

This invention relates to a brushless motor.

Some brushless motors include each a rotor having a plurality of segment magnets. For example, JP-A-2001-359266 discloses a brushless motor including a rotor with a plurality of segment magnets attached on an outer periphery of an annular rotor core.

In JP-A-2001-359266, the segment magnets are stacked at a plurality of stages in the axial direction of the rotor core. The segment magnets configuring each stage are arranged with an equal spacing in the circumferential direction of the rotor core. The segment magnets configuring each stage are arranged so as to be shifted in phase with those at any other stage in the circumferential direction of the rotor core. That is, the rotor has a configuration of a so-called stage skew arrangement.

However, in the rotor described in JP-A-2001-359266, if the number of the stacking stages of the segment magnets and the number of the pole angular aperture of each segment magnetic, etc., are not properly set, it becomes impossible to properly polarize the unpolarized segment magnets attached on the rotor core. That is, if the number of the stacking stages of the segment magnets and the number of the pole angular aperture of each segment magnetic, etc., are not proper, two magnetic poles of N and S poles occur in the outer surface of the same segment magnet polarized after the segment magnet is attached on the rotor core.

Even though already polarized segment magnets are attached on the rotor core, it is difficult to attach the segment magnets on the rotor core with good position accuracy because the segment magnets have already magnetized; this is a problem.

SUMMARY

It is therefore an object of the invention to provide a brushless motor for making it possible to properly polarize unpolarized segment magnets attached on a rotor core.

In order to achieve the above object, according to the present invention, there is provided a brushless motor (1, 1a, 1b), comprising:

a stator (4) that includes:
an annular stator core (8, 108, 208) having teeth (12) arranged with a spacing in a circumferential direction (Y2) of the annular stator core; and
coils (9) wound around the teeth respectively; and
a rotor (3, 203) that includes a rotor core (6) and magnetic poles of segment magnets (7) arranged annularly along a circumferential direction (Y1) of the rotor core, the segment magnets stacked at a plurality of stages in an axial direction (X1) of the rotor core,
wherein a length direction (A1) of each of the segment magnets is parallel with the axial direction of the rotor core; and
wherein the following expression is satisfied:

$$(2\times\beta/P)+\theta<(360/P)$$

where P is the number of the magnetic poles of the segment magnets at each stage, $\beta$ (electrical angle) is the effective pole angular aperture on the outer peripheral surface of the rotor core, and $\theta$ is the skew angle equivalent to a phase shift angle between the corresponding magnetic poles of the segment magnets at the adjacent stages.

According to the invention, the number of the magnetic poles P, the effective pole angular aperture $\beta$ (electrical angle), and the skew angle $\theta$ are set so that the expression is satisfied, whereby unpolarized segment magnets arranged on the rotor core can be properly polarized.

That is, the term $(2\times\beta/P)$ in the expression is equivalent to the width of one segment magnet with respect to the circumferential direction of the rotor core. The skew angle $\theta$ in the expression is equivalent to the shift amount in the circumferential direction of the rotor core between the corresponding magnetic poles of the segment magnets at the adjacent stages. The term $(360/P)$ in the expression is equivalent to the theoretical width of one pole with respect to the circumferential direction of the rotor core.

Therefore, if the expression is satisfied, the sum of the width of one segment magnet with respect to the circumferential direction of the rotor core and the shift amount in the circumferential direction of the rotor core between the corresponding magnetic poles of the segment magnets at the adjacent stages becomes smaller than the theoretical width of one pole with respect to the circumferential direction of the rotor core. Accordingly, if unpolarized segment magnets arranged on the rotor core are polarized, different magnetic poles do not occur in the outer surface of the same segment magnet.

For example, if the number of the stacking stages of the segment magnets is n, the skew angle of the whole of the segment magnets stacked at n stages, $(n\times\theta)$, corresponds to a skew angle $\theta'$ when unpolarized ring magnets are skew-polarized ($\theta'=n\times\theta$). That is, as the segment magnets are stacked, the skew angle when ring magnets are skew-polarized is artificially accomplished and moreover as the expression is satisfied, it is made possible substantially to polarize the unpolarized segment magnets after they are arranged on the rotor core.

When the number of the stacking stages of the segment magnets is n, n may be two. Specifically, n may be two if an axial extension part (15) extending outward in an axial direction (X2) of the stator core is provided at a tip (14) of each tooth with respect to a radial direction (Z2) of the stator core. If the shape of the stator core is symmetrical with an axial center portion (10) of the stator core as the boundary, n may be two. Further, if the stator core is formed using different types of materials and the material of the same type is placed symmetrically with an axial center portion of the stator core as the boundary, n may be two. Further, if the magnetic poles of the rotor contain overhang parts (23 and 24) overhanging outward in the axial direction of the rotor core so as not to be opposed to the stator core in the radial direction, n may be two.

In the cases, the cogging torque at each axial position of the brushless motor is canceled out by the cogging torque at a different axial position, and the cogging torque as the whole brushless motor is theoretically zero at all times. Therefore, torque unevenness of the brushless motor is decreased.

Although the alphanumeric characters in parentheses represent the reference numerals of the corresponding components in embodiments described later, it is to be understood that the reference numerals do not limit the scope of Claims.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Referring now to the accompanying drawings, there are shown embodiments of the invention.

Figure 1:
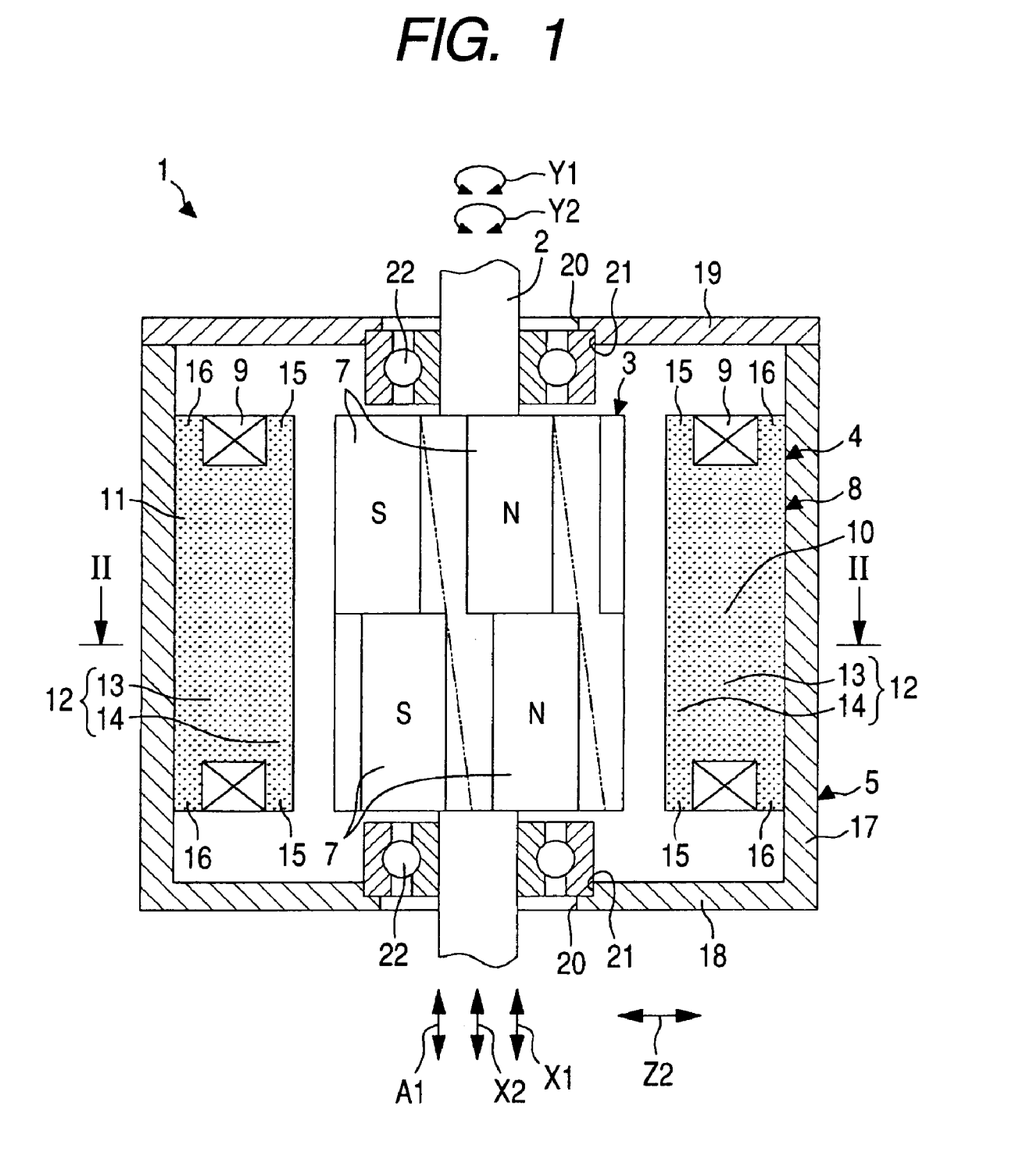
FIG. 1 is an illustrated fragmentary sectional view of a brushless motor according to one embodiment of the invention.
Figure 2:
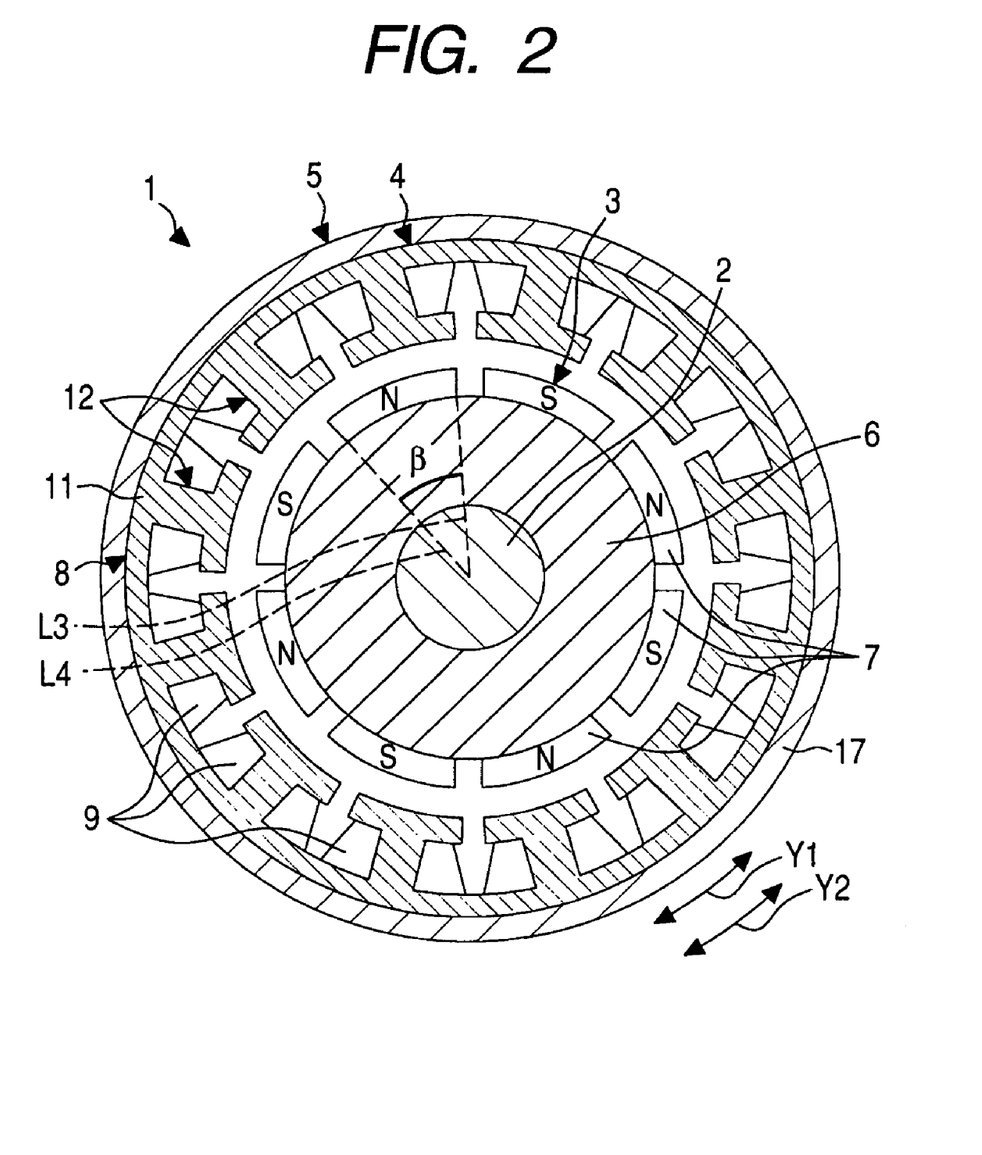
FIG. 2 is an illustrated sectional view of the brushless motor taken on line II-II.

FIG. 1 is an illustrated fragmentary sectional view of a brushless motor 1 according to one embodiment of the invention. FIG. 2 is an illustrated sectional view of the brushless motor 1 taken on line II-II, FIG. 3 is a schematic perspective view of a rotor 3, and FIG. 4 is an enlarged view of a part of FIG. 2.

Figure 3:
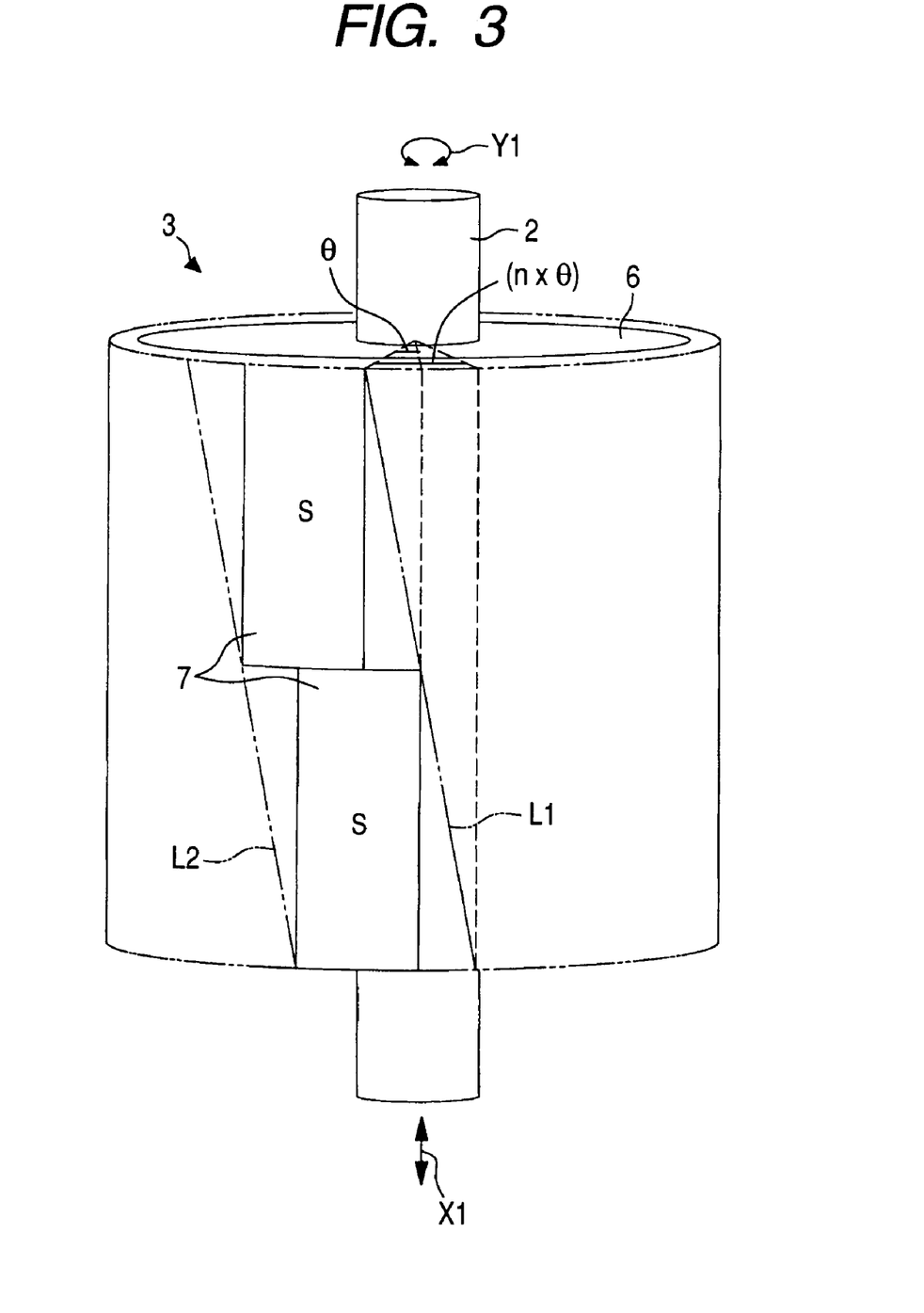
FIG. 3 is a schematic perspective view of a rotor.
Figure 4:
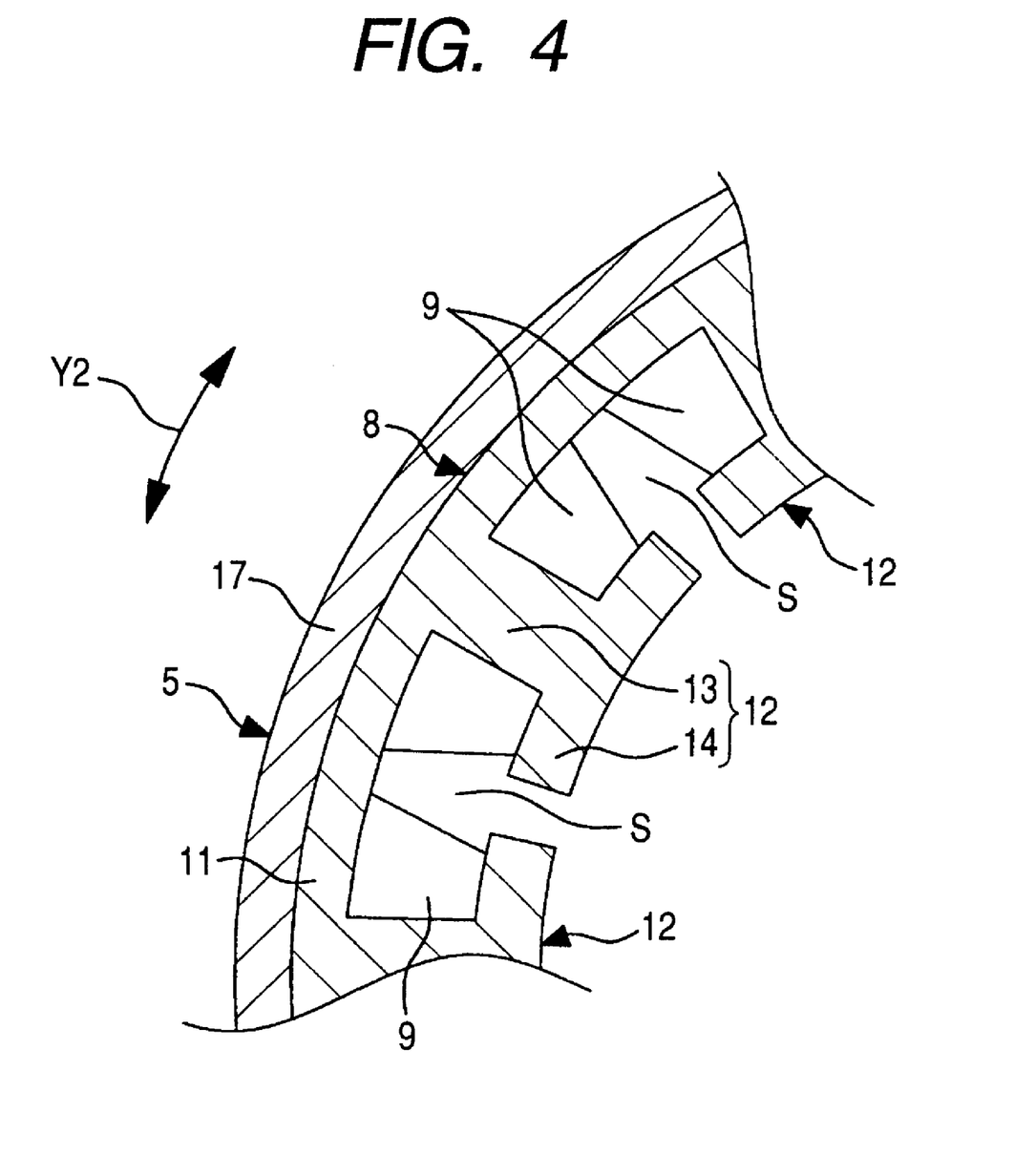
FIG. 4 is an enlarged view of a part of FIG. 2.

Referring to FIGS. 1 to 3, the brushless motor 1 includes an annular rotor 3 joined to a rotation shaft 2 to rotate with the rotation shaft 2, an annular stator 4 surrounding the rotor 3, and a cylindrical frame 5 for housing the rotor 3 and the stator 4. The rotor 3 includes an annular rotor core 6 jointed to the rotation shaft 2 coaxially and a plurality of segment magnets 7 attached on the outer periphery of the rotor core 6, for example, with an adhesive, etc.

Each of the segment magnets 7 has the same shape, and each shaped like a rectangle on a plan view as shown in FIG. 1. The segment magnets 7 are arranged so that a length direction A1 is parallel with an axial direction X1 of the rotor core 6. The segment magnets 7 are stacked at n stages (where "n" is an integer of two or more; in the embodiment, n is two) in the axial direction X1 of the rotor core 6. The segment magnets 7 configuring each stage are arranged with an equal spacing in a circumferential direction Y1 of the rotor core 6 as shown in FIG. 2. In the embodiment, at each stage, eight segment magnets 7 are arranged with an equal spacing in the circumferential direction Y1 of the rotor core 6. The number of the segment magnets 7 at each stage is not limited to eight and can take any other integer of two or more.

As shown in FIG. 1, the segment magnets 7 at the first stage (upper stage) and the segment magnets 7 at the second stage (lower stage) are overlapped in view of the axial direction X1 at a position where the rotor core 6 is divided into two equal parts in the axial direction X1. As shown in FIG. 3, the segment magnets 7 having the same magnetic poles of the outer surfaces, overlapping in the axial direction X1, are shifted in phase in the circumferential direction Y1 of the rotor core 6 at a predetermined phase shift angle (mechanical angle). That is, the segment magnets 7 has a so-called stage skew arrangement with a skew angle θ corresponding to the predetermined phase shift angle. The skew angle as the whole of the segment magnets 7 is (n×θ).

The skew angle of the whole of the segment magnets 7, (n×θ), corresponds to a skew angle θ' when unpolarized ring magnets are skew-polarized (θ'=n×θ). That is, as the segment magnets 7 are stacked, the skew angle in a case that ring magnets are skew-polarized is artificially accomplished.

The stage skew arrangement of the skew angle θ is applied to the segment magnets 7, whereby the substitution effect of a rotor including skew-polarized ring magnets at the skew angle θ' is obtained. Dashed-two dotted lines L1 and L2 in FIG. 3 are boundary lines of magnetic poles in multipolar ring magnets skew-polarized at the skew angle θ' and the area sandwiched between the dashed-two dotted lines L1 and L2 in the circumferential direction Y1 (area having shorter perimeter) is polarized to the same magnetic pole.

The segment magnets 7 are polarized after the segment magnets 7 are attached on the rotor core 6. As shown in FIG. 1, the outer surfaces of the segment magnets 7 adjacent in the circumferential direction Y1 of the rotor core 6 are polarized to different magnetic poles. The rotor 3 has a plurality of magnetic poles of the segment magnets 7. As the magnetic poles at each stage, N and S poles are alternated in the circumferential direction Y1 of the rotor core 6. In the embodiment, the eight segment magnets 7 are arranged at each stage and therefore the number of magnetic poles P is eight.

As shown in FIG. 2, each segment magnet 7 has a predetermined effective pole angular aperture β (electrical angle) on the outer peripheral surface of the rotor core 6. The "effective pole angular aperture β" is an electrical angle corresponding to an angle (mechanical angle) formed by a line L3 and a line L4. The lines L3 and L4 connect end parts of the each segment magnet 7 in the circumferential direction Y1 of the inner surface of the each segment magnet 7 to the center of the rotor core 6 respectively.

Referring to FIGS. 1 and 2, the stator 4 includes an annular stator core 8 and a plurality of coils 9 wound around the stator core 8. The stator core 8 is a magnetic green compact formed of a powder material having a soft magnetic material, for example. The shape of the stator core 8 is made symmetrical with an axial center portion 10 as the boundary. The axial length of the stator core 8 is made almost equal to the axial length of the rotor 3. The stator core 8 includes an annular yoke 11 and teeth 12 projected from the inner periphery of the yoke 11 toward the inside in a radial direction Z2 of the stator core 8. In the embodiment, twelve teeth 12 are provided, for example.

Referring to FIG. 4, the teeth 12 are arranged annularly with an equal spacing in a circumferential direction Y2 of the stator core 8. A slot S is formed between the adjacent teeth 12. In the embodiment, since the twelve teeth 12 are provided, the number of the slots is 12. That is, the brushless motor 1 according to the embodiment is an eight-pole, 12-slot motor.

Each of the teeth 12 has a roughly T shape in cross section and has a radial extension part 13 extending from the inner periphery of the yoke 11 to the inside in the radial direction of the yoke 11 and a circumferential extension part 14 joined to the radial extension part 13 and extending along the circumferential direction of a circle concentric with the yoke 11. Each coil 9 is wound around the outer periphery of the radial extension part 13 of the corresponding tooth 12.

Referring to FIG. 1, an axial extension part 15 extending outward in an axial direction X2 of the stator core 8 is provided at the tip of each tooth 12 with respect to the radial direction Z2 of the stator core 8. That is, the circumferential extension part 14 of each tooth 12 forms the tip of the tooth 12, and the end part with respect to the axial direction X2 of each circumferential extension part 14 is extended outward in the axial direction X2 and forms the axial extension part 15.

In the embodiment, each end part of the yoke 11 with respect to the axial direction X2 is also extended outward in the axial direction X2 and forms an axial extension part 16. The axial extension part 15 of the tooth 12 and the axial extension part 16 of the yoke 11 are opposed to each other with a spacing in the radial direction Z2 of the stator core 8.

Referring to FIGS. 1 and 2, the frame 5 includes a tubular portion 17 and a pair of end walls 18 and 19 arranged in end parts of the tubular portion 17. The stator core 8 is fixed to the inner periphery of the tubular portion 17 by press fitting, for example. Each of the end walls 18 and 19 is formed with an insertion hole 20 through which the rotation shaft 2 is inserted. Each insertion hole 20 is formed with a bearing retention part 21 for retaining a bearing 22. The rotation shaft 2 is supported on the frame 5 for rotation through the bearings 22 retained in the bearing retention parts 21.

Figure 5A:
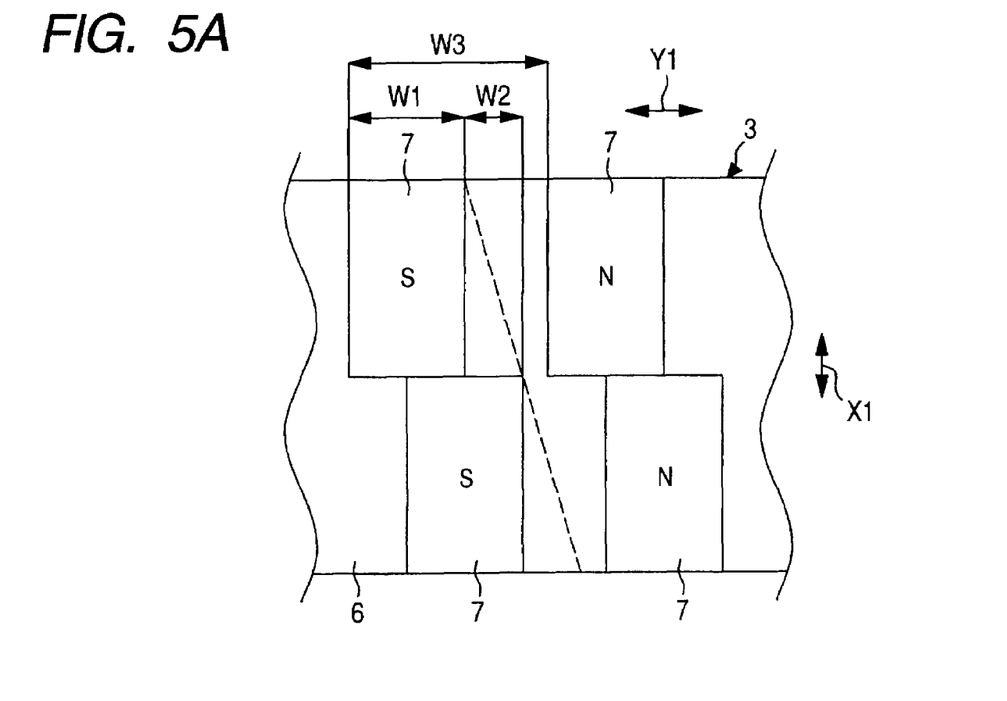
FIGS. 5A and 5B are developed views of developing the rotor in the circumferential direction.
Figure 5B:
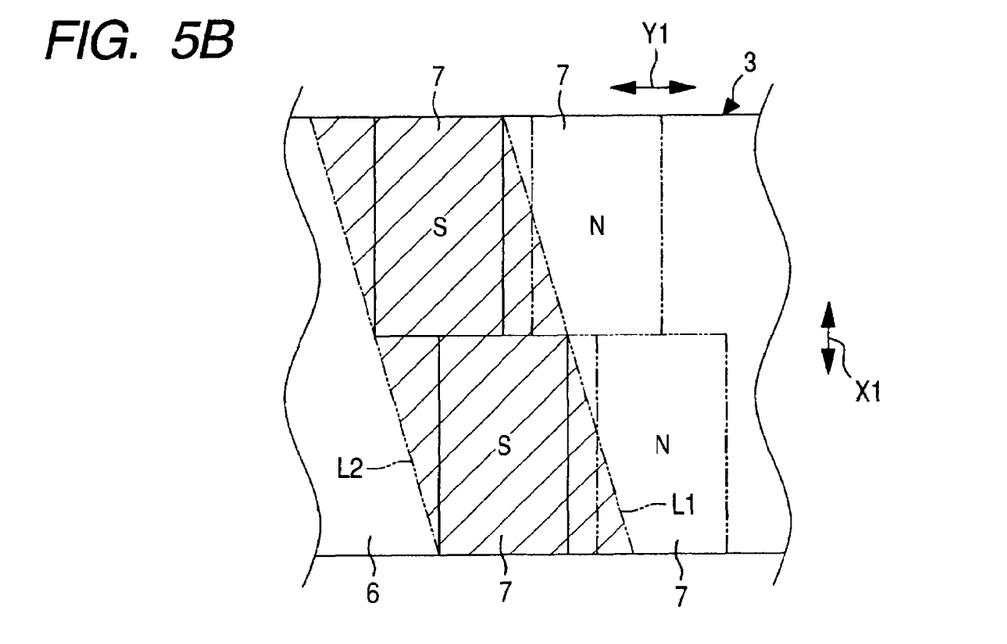

FIGS. 5A and 5B are illustrated developed views of developing the rotor 3 in the circumferential direction Y1.

Referring to FIGS. 5A and 5B, one of the features of the invention is that the number of the magnetic poles P at each stage, the effective pole angular aperture $\beta$ (electrical angle), and the skew angle $\theta$ are set so that the following expression is satisfied:

$$(2\times\beta/P)+\theta<(360/P)$$

The term $(2\times\beta/P)$ in this expression is the mechanical angle corresponding to the effective pole angular aperture $\beta$ and is equivalent to a width W1 of one segment magnet 7 with respect to the circumferential direction Y1 of the rotor core 6 shown in FIG. 5A. The skew angle $\theta$ in the expression is equivalent to a shift amount W2 in the circumferential direction Y1 of the rotor core 6 at the corresponding magnetic poles of the segment magnets 7 at the adjacent stages (the first and second stages) shown in FIG. 5A. The term (360/P) in the expression is equivalent to a theoretical width W3 of one pole with respect to the circumferential direction Y1 of the rotor core 6 shown in FIG. 5A.

Therefore, as the expression is satisfied, the sum of the width W1 of one segment magnet 7 with respect to the circumferential direction Y1 of the rotor core 6 and the shift amount W2 in the circumferential direction Y1 of the rotor core 6 at the corresponding magnetic poles of the segment magnets 7 at the adjacent stages becomes smaller than the theoretical width W3 of one pole with respect to the circumferential direction Y1 of the rotor core 6. Accordingly, it is made possible to properly polarize unpolarized segment magnets 7 attached on the rotor core 6.

That is, if the expression is not satisfied, one segment magnet 7 and a part of the segment magnet 7 (indicated by the dashed-two dotted line) adjacent to that segment magnet 7 in the circumferential direction Y1 are arranged at each stage in the hatched area in FIG. 5B. The hatched area is the area sandwiched between the boundary lines (dashed-two dotted lines L1 and L2) of the magnetic poles in multipolar ring magnets skew-polarized at the skew angle $\theta'$ ($\theta'=n\times\theta$) (see FIG. 3) and the outer surfaces of the segment magnets 7 arranged in the hatched area are polarized to the same magnetic pole (for example, S pole).

Therefore, when the expression is not satisfied, if unpolarized segment magnets 7 attached on the rotor core 6 are polarized, a part of the outer surface of the segment magnet 7 adjacent in the circumferential direction Y1 is polarized to the S pole. That is, most of the outer surface of the segment magnet 7 adjacent in the circumferential direction Y1 is polarized to the N pole, but a part of the outer surface is polarized to the S pole and different magnetic poles occur in the outer surface of the same segment magnet 7. Therefore, if the expression is not satisfied, the unpolarized segment magnets 7 attached on the rotor core 6 cannot properly be polarized.

On the other hand, if the expression is satisfied, a part of the segment magnet 7 adjacent in the circumferential direction Y1 is not arranged in the hatched area. Therefore, if the unpolarized segment magnets 7 arranged on the rotor core 6 are polarized, different magnetic poles do not occur in the outer surface of the same segment magnet 7. Accordingly, the unpolarized segment magnets 7 arranged on the rotor core 6 can be properly polarized.

In the embodiment, the segment magnets 7 are stacked, whereby the skew angle $\theta'$ when ring magnets are skew-polarized is artificially accomplished and moreover as the expression is satisfied, it is made possible substantially to polarize the unpolarized segment magnets 7 after they are arranged on the rotor core 6. Since the segment magnets 7 can be arranged on the rotor core 6 in an unpolarized state, the productivity of the brushless motor 1 is improved. That is, the segment magnets 7 are not magnetized and thus can be arranged on the rotor core 6 with good position accuracy.

Figure 6A:
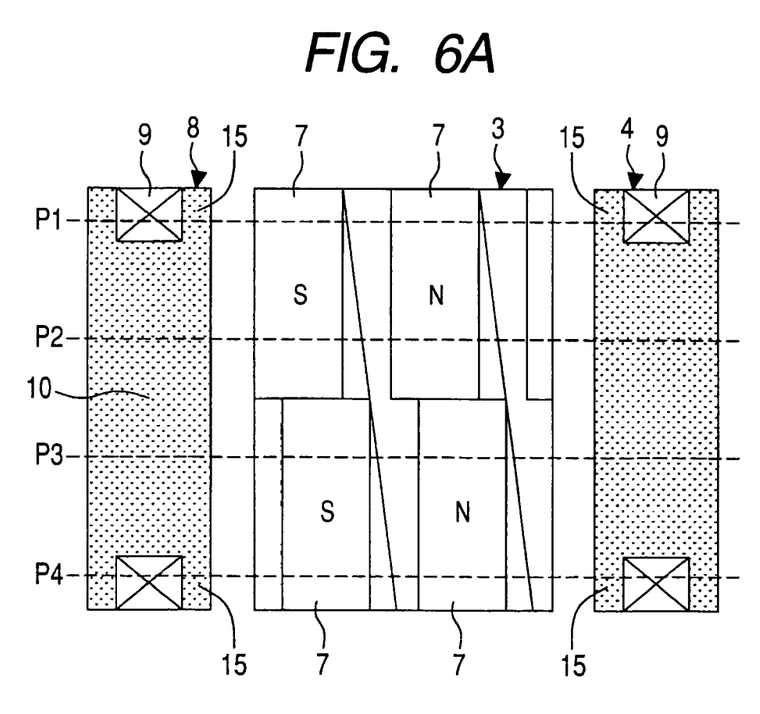
FIGS. 6A and 6B are drawings to describe cogging torque in the brushless motor.
Figure 6B:
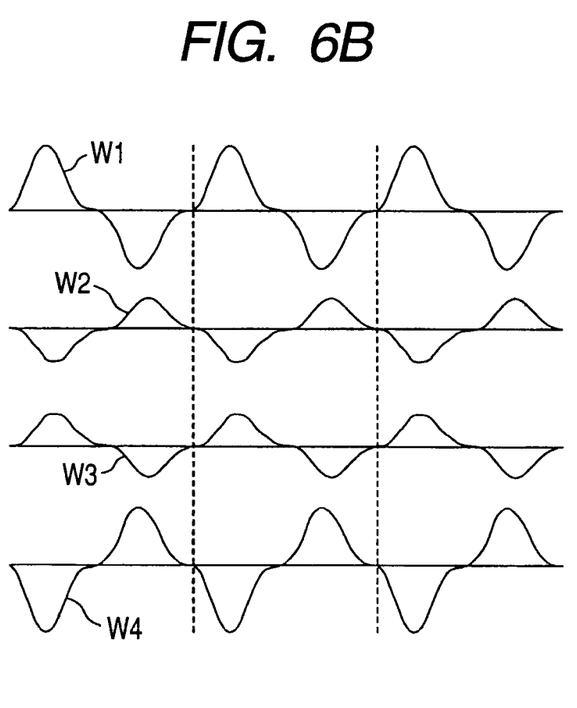

FIGS. 6A and 6B are drawings to describe cogging torque in the brushless motor 1. FIG. 6A shows the rotor 3 and the stator 4 illustratedly. FIG. 6B shows change in cogging torque relative to the rotation position of the rotor 3. That is, waveforms W1, W2, W3, and W4 show change in cogging torque relative to the rotation positions of the rotor 3 at predetermined axial positions of the brushless motor 1. The up and down direction in FIG. 6B corresponds to the magnitude of the cogging torque.

Referring to FIGS. 6A and 6B, the waveform W1 shows change in cogging torque at an axial position P1 corresponding to the upper axial extension part 15 in FIG. 6A, and the waveform W4 shows change in cogging torque at an axial position P4 corresponding to the lower axial extension part 15 in FIG. 6A. The waveform W2 shows change in cogging torque at an axial position P2 corresponding to the axial center portion 10 of the status core 8 and the segment magnets 7 at the first stage, and the waveform W3 shows change in cogging torque at an axial position P3 corresponding to the axial center portion 10 of the status core 8 and the segment magnets 7 at the second stage.

As shown in FIG. 6B, the waveforms W1 and W4 are equal waveforms out of phase with each other by 180 degrees. Therefore, the cogging torque at the axial position P1 is canceled out by the cogging torque at the axial position P4. The waveforms W2 and W3 are equal waveforms out of phase with each other by 180 degrees. Therefore, the cogging torque at the axial position P2 is canceled out by the cogging torque at the axial position P3.

That is, in the embodiment, the cogging torque at each axial position of the brushless motor 1 is canceled out by the cogging torque at the corresponding axial position, and the cogging torque as the whole brushless motor 1 is theoretically zero at all times. Accordingly, the noise and vibration of the brushless motor 1 are reduced.

Figure 7:
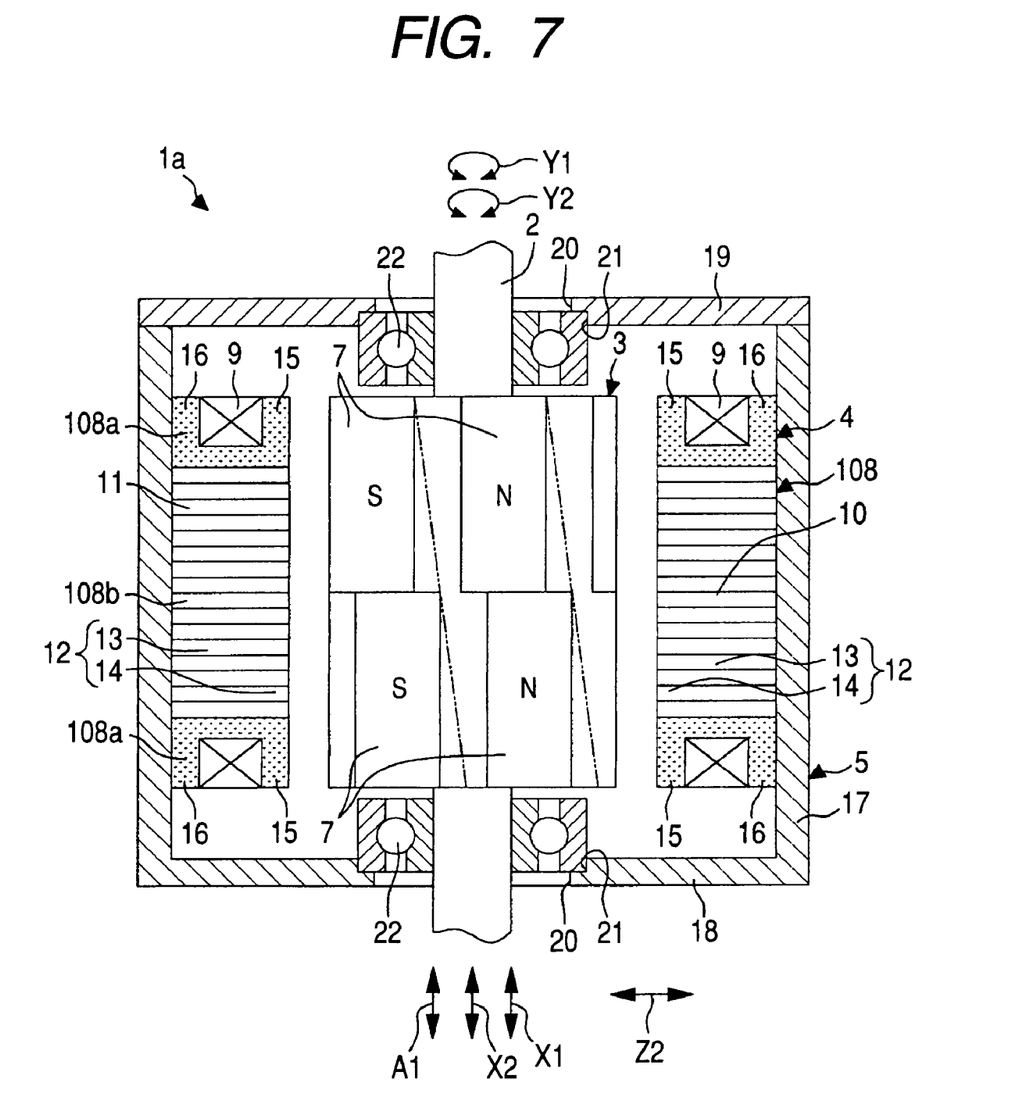
FIG. 7 is an illustrated fragmentary sectional view of a brushless motor according to another embodiment of the invention.

FIG. 7 is an illustrated fragmentary sectional view of a brushless motor 1a according to another embodiment of the invention. Components identical with or similar to those previously described with reference to FIGS. 1 to 6B are denoted by the same reference numerals in FIG. 7 and will not be discussed again.

Referring to FIG. 7, the embodiment differs from the embodiment described above mainly in that a stator core 108 is formed using different types of materials and the material of the same type is arranged symmetrically with an axial center portion 10 of the stator core 108 as the boundary.

Specifically, the stator core 108 is divided into three parts in an axial direction X2. The stator core 108 is configured by a pair of green compact cores 108a and 108a formed of magnetic green compacts and a laminated core 108b formed of a laminated steel plate. The laminated steel plate is provided by laminating and fixing in the axial direction X2 a plurality of thin sheets each formed by stamping a magnetic steel sheet into a predetermined shape. For example, a silicon steel plate having a surface subjected to insulating treatment, etc., can be used as the magnetic steel sheet.

The laminated core 108b is arranged in an intermediate part of the stator core 108 in the axial direction thereof. The green compact cores 108a and 108a are arranged at end parts of the laminated core 108b and are fixed to the end parts. The shape of the laminated core 108b is symmetrical with the axial center portion 10 as the boundary. The green compact cores 108a and 108a are of the same shape and are arranged symmetrically with the axial center portion 10 as the boundary.

In the embodiment, the shape of the laminated core 108b is made symmetrical with the axial center portion 10 as the boundary, the green compact cores 108a and 108a are arranged symmetrically with the axial center portion 10 as the boundary, and segment magnets 7 involve a stage skew arrangement, so that the cogging torque at each axial position of the brushless motor 1a is canceled out by the cogging torque at the corresponding axial position and the cogging torque as the whole brushless motor 1a is theoretically zero at all times. Accordingly, the noise and vibration of the brushless motor 1 are reduced.

Figure 8:
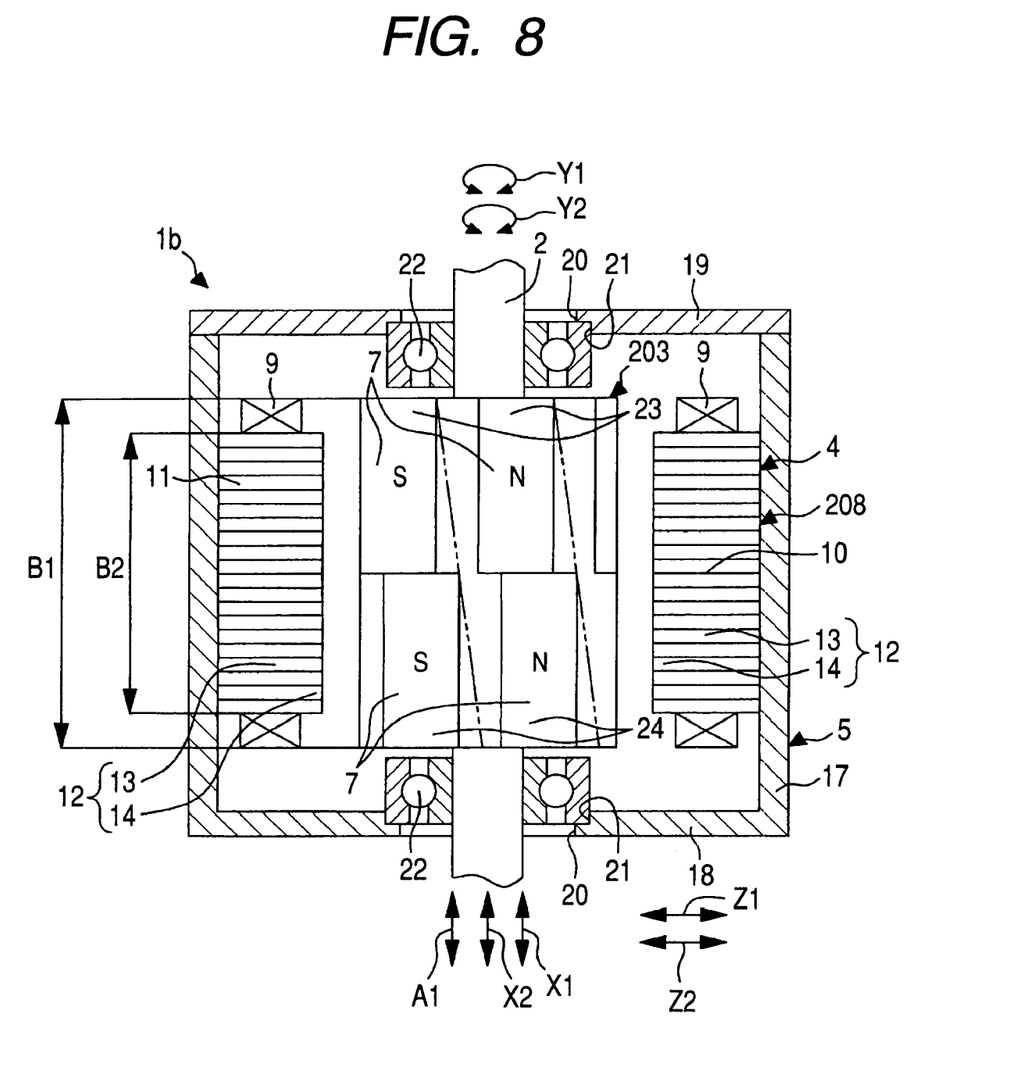
FIG. 8 is an illustrated fragmentary sectional view of a brushless motor according to still another embodiment of the invention.
Figure 9A:
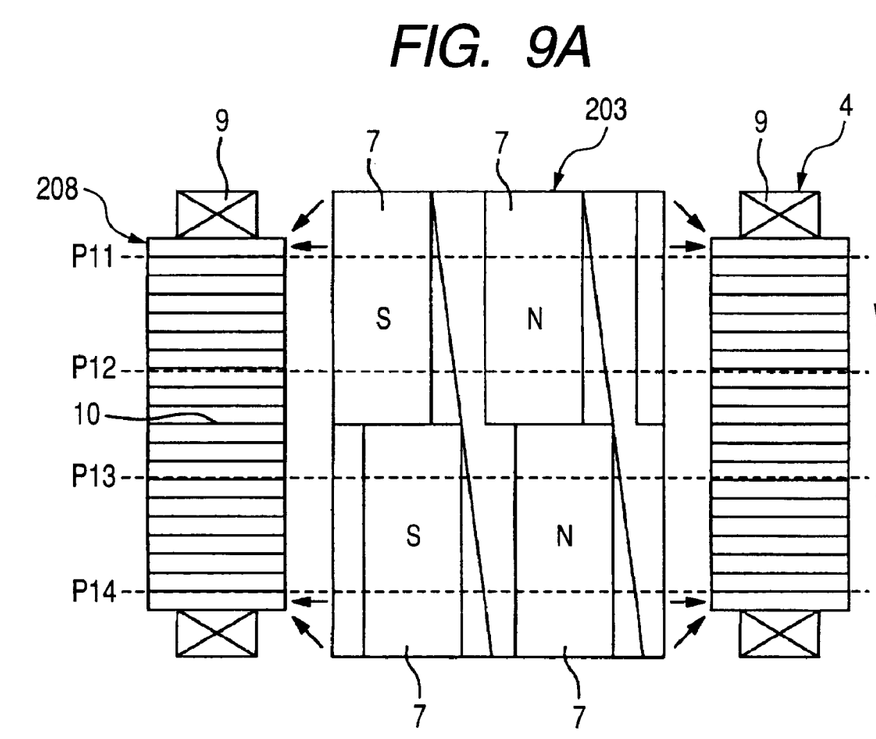
FIGS. 9A and 9B are drawings to describe cogging torque in the brushless motor in FIG. 8.
Figure 9B:
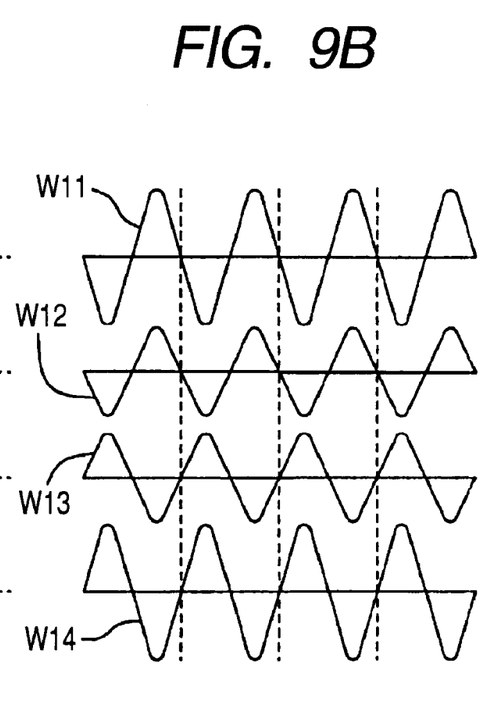

FIG. 8 is an illustrated fragmentary sectional view of a brushless motor 1b according to still another embodiment of the invention. FIGS. 9A and 9B are drawings to describe cogging torque in the brushless motor 1b in FIG. 8. Components identical with or similar to those previously described with reference to FIGS. 1 to 6B are denoted by the same reference numerals in FIGS. 8, 9A and 9B and will not be discussed again.

Referring to FIG. 8, the embodiment differs from the embodiment previously described with reference to FIGS. 1 to 6B mainly in that magnetic poles of a rotor 203 has overhang parts (first overhang part 23 and second overhang part 24) overhanging outward in an axial direction X1 of a rotor core 6 so as not to be opposed to a stator core 208.

Specifically, the upper end part of each of segment magnets 7 making up a first stage is overhung upward in the axial direction X1 and forms the first overhang part 23. The first overhang part 23 is not opposed to the stator core 208 with respect to a radial direction Z1 of the rotor core 6. The lower end part of each of the segment magnets 7 making up a second stage is overhung downward in the axial direction X1 and forms the second overhang part 24. The second overhang part 24 is not opposed to the stator core 208 with respect to a radial direction Z1 of the rotor core 6.

A length B1 of the rotor core 6 relative to the axial direction X1 (segment magnet 7 at the first stage plus segment magnet 7 at the second stage) is made larger than an axial length B2 of the stator core 208 (B1>B2). The length of the first overhang part 23 relative to the axial direction X1 of the rotor core 6 and that of the second overhang part 24 relative to the axial direction X1 of the rotor core 6 are made equal to each other.

The stator core 208 is formed of a laminated steel plate. The shape of the stator core 208 is made symmetrical with an axial center portion 10 as the boundary.

Referring to FIGS. 9A and 9B, a waveform W11 shows change in cogging torque at an axial position P11 corresponding to the axial upper end part of the stator core 208, and a waveform W14 shows change in cogging torque at an axial position P14 corresponding to the axial lower end part of the stator core 208. The waveform W12 shows change in cogging torque at an axial position P12 corresponding to the axial center portion 10 of the status core 208 and the segment magnets 7 at the first stage, and the waveform W13 shows change in cogging torque at an axial position P13 corresponding to the axial center portion 10 of the status core 208 and the segment magnets 7 at the second stage.

As shown in FIG. 9B, the amplitude of the waveform W11 and the amplitude of the waveform W14 are larger than the amplitude of the waveform W12 and the amplitude of the waveform W13, because the magnetic flux from a part of each segment magnet 7 at the first stage opposed to the axial upper end part of the stator core 208 and the magnetic flux from the first overhang part 23 enter the axial upper end part and concentrate thereon, as indicated by arrows in FIG. 9A. Likewise, the magnetic flux from a part of each segment magnet 7 at the second stage opposed to the axial lower end part of the stator core 208 and the magnetic flux from the second overhang part 24 enter the axial lower end part and concentrate thereon.

On the other hand, as shown in FIG. 9B, the waveforms W11 and W14 are equal waveforms out of phase with each other by 180 degrees. The waveforms W12 and W13 are equal waveforms out of phase with each other by 180 degrees. Therefore, the cogging torque at each axial position of the brushless motor 1b is canceled out by the cogging torque at the corresponding axial position and the cogging torque as the whole brushless motor 1b is theoretically zero at all times.

Figure 10:
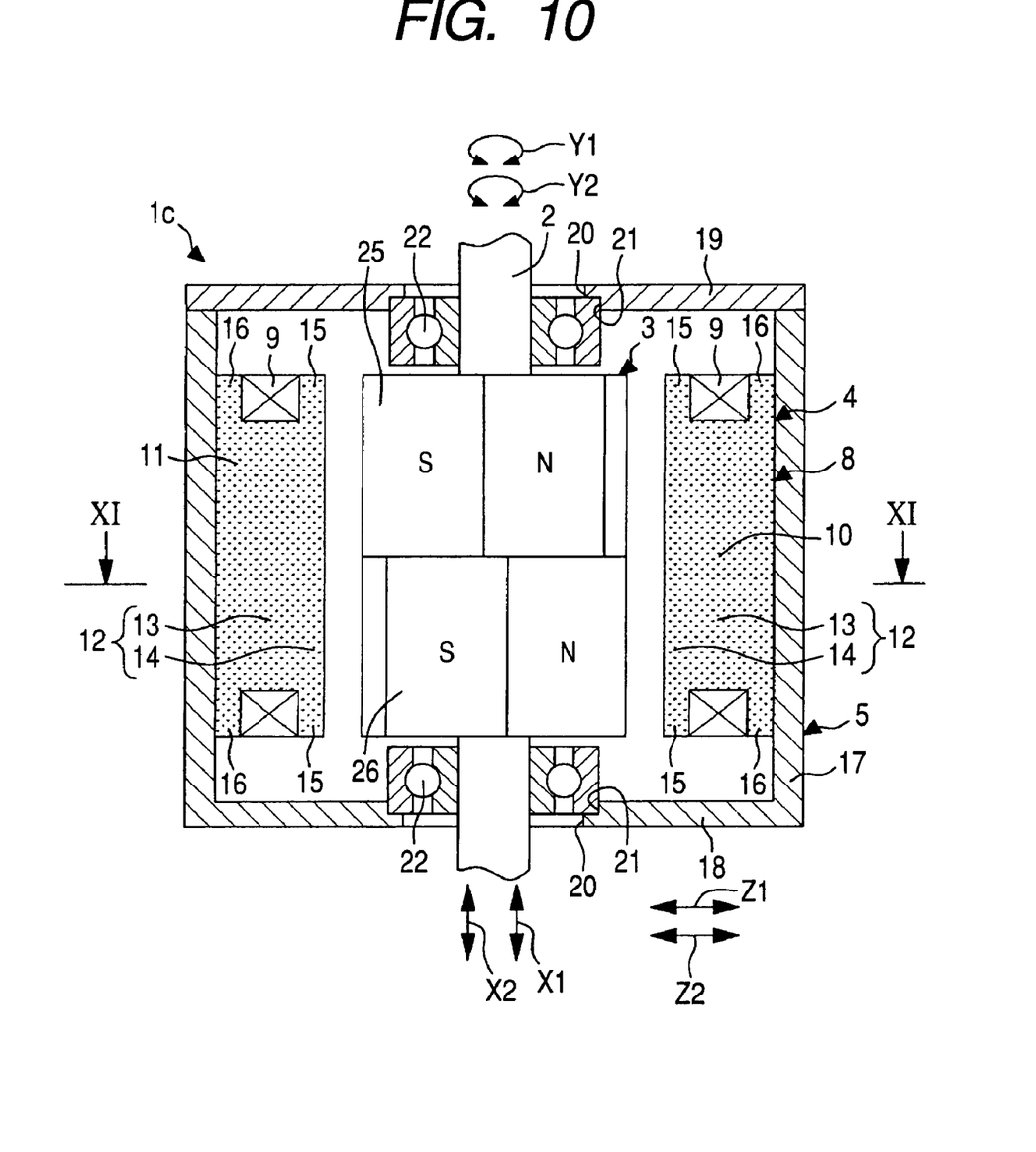
FIG. 10 is an illustrated fragmentary sectional view of a brushless motor according to a reference example.
Figure 11:
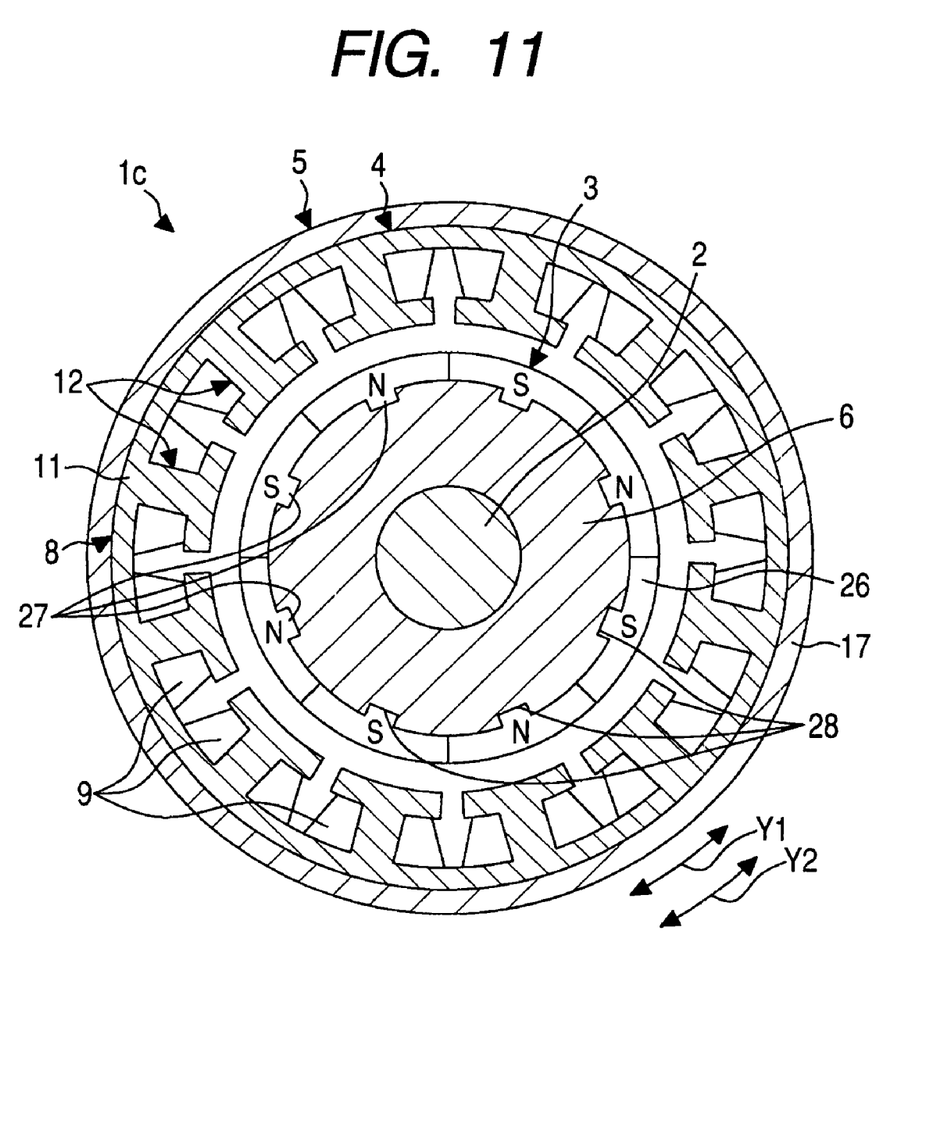
FIG. 11 is an illustrated sectional view of the brushless motor taken on line XI-XI in FIG. 10.

FIG. 10 is an illustrated fragmentary sectional view of a brushless motor 1c according to a reference example. FIG. 11 is an illustrated sectional view of the brushless motor 1c taken on line XI-XI in FIG. 10. Components identical with or similar to those previously described with reference to FIGS. 1 to 6B are denoted by the same reference numerals in FIGS. 10 and 11 and will not be discussed again.

Referring to FIGS. 10 and 11, the reference example differs from the embodiment previously described with reference to FIGS. 1 to 6B mainly in that a pair of ring magnets 25 and 26 is arranged on the outer periphery of a rotor core 6.

The ring magnets 25 and 26 are of the same shape and are stacked at two stages in an axial direction X1 of the rotor core 6. The ring magnets 25 and 26 are fixed to the rotor core 6 coaxially. Each of the ring magnets 25 and 26 is a multipolar magnet having a plurality of magnetic poles and as the magnetic poles of the outer peripheral surface of each of the ring magnets 25 and 26, N and S poles are alternated in the circumferential direction of the ring magnet 25, 26. As shown in FIG. 11, each of the ring magnets 25 and 26 has eight magnetic poles, for example. As shown in FIG. 10, each of the ring magnets 25 and 26 is polarized in parallel in the axial direction of the ring magnet 25, 26. That is, the boundary line between the magnetic poles of the outer peripheral surface of the ring magnet 25, 26 adjacent in the circumferential direction of the ring magnet 25, 26 is parallel in the axial direction of the ring magnet 25, 26. The ring magnets 25 and 26 are arranged on the rotor core 6 after they are polarized.

As shown in FIG. 11, each of the ring magnets 25 and 26 is formed on the inner periphery with a plurality of projections 27 extending in the axial direction of the ring magnet 25, 26. In the reference example, each of the ring magnets 25 and 26 is formed with as many projections 27 as the number of the magnetic poles of each of the ring magnets 25 and 26. The projections 27 are provided in a one-to-one correspondence with the magnetic poles of the ring magnet 25 or 26. Each projection 27 is arranged at the center of the corresponding magnetic pole with respect to the circumferential direction of the ring magnet 25, 26. Each projection 27 is arranged across the magnetic poles adjacent in the circumferential direction of the ring magnet 25, 26.

The rotor core 6 is formed on the outer periphery with a plurality of recess parts 28 in a one-to-one correspondence with the projections 27 formed on the ring magnets 25 and 26. Each recess part 28 extends in the axial direction X1 of the rotor core 6. The ring magnets 25 and 26 are fixed to the outer periphery of the rotor core 6 in a state in which the projections 27 of the ring magnets 25 and 26 are fitted into the corresponding recess parts 28. Accordingly, the ring magnets 25 and 26 are positioned relative to the rotor core 6 with good accuracy.

The ring magnet 25 at the first stage (upper stage) and the ring magnet 26 at the second stage (lower stage) overlap at a position where the rotor core 6 is divided into two equal parts in the axial direction X1. The ring magnet 25 at the first stage and the ring magnet 26 at the second stage are fixed to the rotor core 6 in a state in which they are shifted in phase in the circumferential direction Y1 of the rotor core 6. Specifically, the ring magnet 26 at the second stage is shifted in the circumferential direction Y1 of the rotor core 6 relative to the ring magnet 25 at the first stage at the angle corresponding to the half period of the basic-order component of the cogging torque at the axial position corresponding to the ring magnet 25 at the first stage or 360 degrees/(6×number of magnetic poles at each stage). In the reference example, the number of the magnetic poles at each stage is eight and therefore "360 degrees/(6× number of magnetic poles at each stage)" is 7.5 degrees.

The ring magnet 26 at the second stage is shifted in the circumferential direction Y1 of the rotor core 6 at "the angle corresponding to the half period of the basic-order component of the cogging torque" relative to the ring magnet 25 at the first stage, whereby the cogging torque at the axial position corresponding to the ring magnet 25 at the first stage can be canceled out by the cogging torque at the axial position corresponding to the ring magnet 26 at the second stage.

On the other hand, the ring magnet 26 at the second stage is shifted in the circumferential direction Y1 of the rotor core 6 at 7.5 degrees relative to the ring magnet 25 at the first stage, whereby not only the cogging torque, but also the sixth component of torque ripple can be canceled out.

As described above, in the embodiment, the ring magnet 26 at the second stage is shifted in the circumferential direction Y1 of the rotor core 6 at a predetermined angle relative to the ring magnet 25 at the first stage, whereby the cogging torque, etc., at each axial position of the brushless motor 1c is canceled out by the cogging torque, etc., at the corresponding axial position. Accordingly, the cogging torque and the sixth component of torque ripple as the whole brushless motor 1c are theoretically set to zero at all times.

Since the position accuracy of the ring magnets 25 and 26 relative to the rotor core 6 is improved, the cogging torque, etc., can be canceled out reliably. Further, the ring magnets 25 and 26 are used, so that the number of steps of attaching the magnets on the rotor core 6 is decreased as compared with the case where segment magnets are used.

It is to be understood that the invention is not limited to the specific embodiments described above and various changes and modifications can be made without departing from the spirit and the scope of the invention as claimed. For example, each of the stator cores 8, 108, and 208 may be made up of split cores split in the circumferential direction Y2.

What is claimed is:

1. A brushless motor, comprising:
   a stator that includes:
      an annular stator core having teeth arranged with a spacing in a circumferential direction of the annular stator core; and
      coils wound around the teeth respectively; and
   a rotor that includes a rotor core and magnetic poles of segment magnets arranged annularly along a circumferential direction of the rotor core, the segment magnets stacked at a plurality of stages in an axial direction of the rotor core,
   wherein a length direction of each of the segment magnets is parallel with the axial direction of the rotor core; and
   wherein the following expression is satisfied:

$$(2\times\beta/P)+\theta<(360/P)$$

where P is the number of the magnetic poles of the segment magnets at each stage, β (electrical angle) is the effective pole angular aperture on the outer peripheral surface of the rotor core, and θ is the skew angle equivalent to a phase shift angle between the corresponding magnetic poles of the segment magnets at the adjacent stages.

2. The brushless motor according to claim 1, wherein when the number of the stacking stages of the segment magnets is n, n is two.

3. The brushless motor according to claim 2, wherein an axial extension part extended outward in an axial direction of the stator core is provided at a tip of each of the teeth with respect to a radial direction of the stator core.

4. The brushless motor according to claim 2, wherein a shape of the stator core is symmetrical with an axial center portion of the stator core as a boundary.

5. The brushless motor according to claim 2, wherein the stator core is comprised of different types of materials; and
   wherein the materials of the same type are arranged symmetrically with an axial center portion of the stator core as a boundary.

6. The brushless motor according to claim 2, wherein the magnetic poles of the rotor include overhang parts overhanging outward in the axial direction of the rotor core so as not to be opposed to the stator core in the radial direction of the rotor.

* * * * *